(12) United States Patent
Lo et al.

(10) Patent No.: US 8,005,991 B2
(45) Date of Patent: Aug. 23, 2011

(54) VIRTUAL MACHINE IMAGE MANAGEMENT SYSTEM AND METHODS THEREOF

(75) Inventors: Yuan-Chang Lo, Austin, TX (US); Ranjith Purushothaman, Cedar Park, TX (US); Eldho V. Kuriakose, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 372 days.

(21) Appl. No.: 12/192,250

(22) Filed: Aug. 15, 2008

(65) Prior Publication Data

US 2010/0042672 A1    Feb. 18, 2010

(51) Int. Cl.
G06F 15/16 (2006.01)
(52) U.S. Cl. ............................ 709/248; 709/233
(58) Field of Classification Search .............. 709/248, 709/233
See application file for complete search history.

(56) References Cited

U.S. PATENT DOCUMENTS

| | | | | |
|---|---|---|---|---|
| 6,108,409 | A * | 8/2000 | Cooper et al. | 379/230 |
| 2002/0041605 | A1 * | 4/2002 | Benussi et al. | 370/467 |
| 2004/0171369 | A1 * | 9/2004 | Little et al. | 455/410 |
| 2008/0222375 | A1 * | 9/2008 | Kotsovinos et al. | 711/162 |
| 2009/0002385 | A1 * | 1/2009 | Blixt | 345/555 |
| 2009/0172041 | A1 * | 7/2009 | Clarke et al. | 707/201 |
| 2009/0222880 | A1 * | 9/2009 | Mayer et al. | 726/1 |
| 2010/0077396 | A1 * | 3/2010 | Choi et al. | 718/1 |
| 2010/0088699 | A1 * | 4/2010 | Sasaki | 718/1 |

OTHER PUBLICATIONS

U.S. Appl. No. 11/961,048, filed Dec. 20, 2007.
U.S. Appl. No. 11/961,079, filed Dec. 20, 2007.
U.S. Appl. No. 11/944,018, filed Nov. 21, 2007.

* cited by examiner

*Primary Examiner* — Patrice Winder
*Assistant Examiner* — Ebrahim Golabbakhsh
(74) *Attorney, Agent, or Firm* — Larson Newman, LLP

(57) ABSTRACT

A virtual machine image (VMI) repository stores a set of VMIs. A subset of the VMIs can be associated with a designated user. In response to receiving a request from a remote device identifying the designated user, a list of the subset of VMIs is communicated to the remote device via a network. The user can select one of the VMIs from the list and the VMI repository can provide the selected VMI to the remote device. The user is thereby permitted to select a VMI suited to a particular use or environment, such as a VMI associated with a work environment.

17 Claims, 4 Drawing Sheets

VIRTUAL MACHINE IMAGE MANAGEMENT SYSTEM AND METHODS THEREOF

FIELD OF THE DISCLOSURE

This disclosure relates generally to information handling systems, and more particularly relates to virtual machine images for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

As the use of information handling systems has increased, so too have the types of environments where the systems are used. For example, a typical user may use one information handling system at work, a second information handling system at home, and other information handling systems at school or when traveling. The separate nature of these information handling systems can result in inconvenience to the user, as the user must maintain each system, and typically must be at the physical location of an information handling system in order to interact with all aspects of that system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
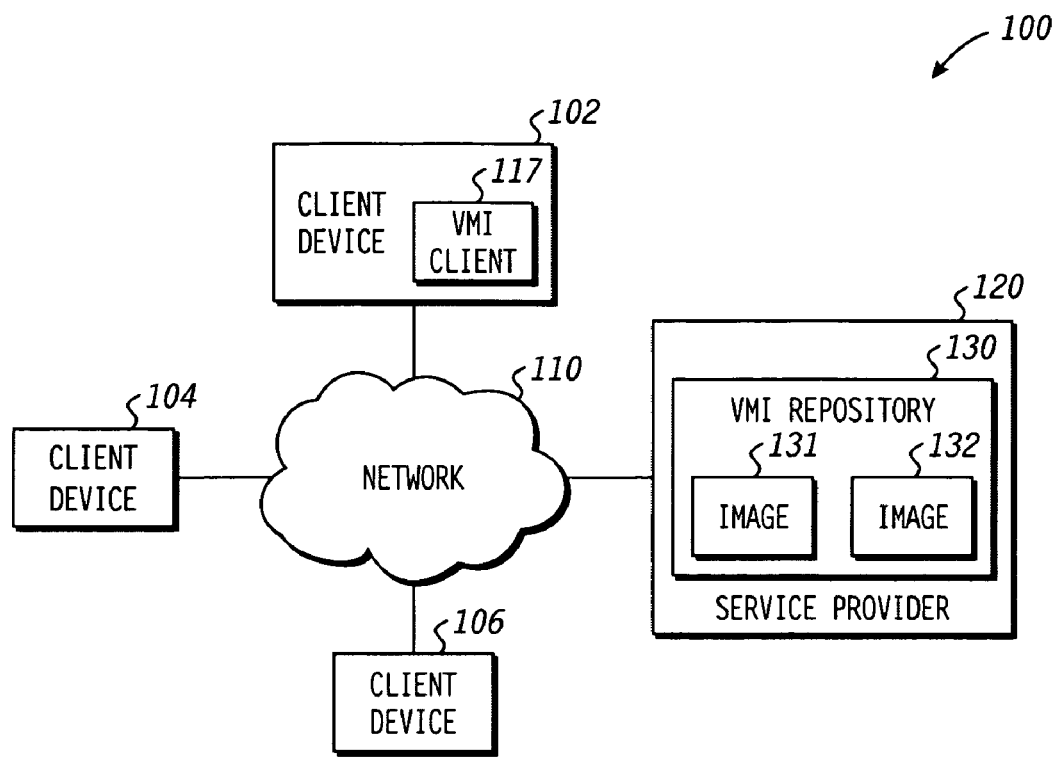
FIG. 1 illustrates a block diagram of communication network in accordance with one embodiment of the present disclosure.

FIG. 1 illustrates a block diagram of a communication network 100 including client devices 102, 104, and 106 (client devices 102-106), a network 110, and a service provider 120. The clients 102, 104, and 106, and the service provider 120 are each connected to the network 110. In the illustrated embodiment of FIG. 1, the network 110 is a packet-switched network that provides a physical layer for communication of information between the client devices 102-106 and the service provider 120. Further, in the illustrated embodiment the network 110 is a wide area network such as the Internet. The network 110 can also include a combination of networks, such as a combination of local and wide area networks.

The client devices 102-106 are each information handling devices configured to receive a virtual machine image (VMI) from the network 110 and run the virtual machine (VM) represented by the image. As used herein, a virtual machine refers to a software emulation of an information handling system, such as a computer. In one embodiment, the virtual machine emulates operation of a particular information handling system, such as a computer using a particular processor and chipset. A VM can be configured to executed software designed for a particular information handling system on a different information handling system for which the software was not designed. In addition, a virtual machine image is a set of information indicating a particular configuration of the associated virtual machine. Accordingly, the virtual machine image can indicate software applications, data files, hardware and software configurations, memory states, and other information to allow the virtual machine to emulate operation of the information handling system.

In one embodiment, one or more of the client devices 102-106 is a thin-client device, whereby the client device is configured to run received VMIs but is not configured to, based on information stored locally at the client device, operate independently as a full-featured computer system based for a user. For example, the thin client may not locally store a full operating system or application software. In other embodiments, one or more of the client devices 102-106 is a thick client, whereby the client device stores a full operating system or other software that allows the device to operate as a full-featured computer system independent of running a VMI.

The service provider 120 is configured to provide information and services in response to requests received from the network 110. As illustrated, the service provider 120 includes a VMI repository 130 to store a plurality of VMIs, including VMIs 131 and 132. The VMI repository 130 is configured to receive identification information from the network 110 and is configured to search the plurality of VMIs based on the identification information and select a set of VMIs associated with the identification information. The VMI repository 130 is configured to provide option information associated with the selected set to the network 110, and to receive VMI selection information in response to providing the option information. In addition, the VMI repository 130 is configured to provide a VMI to the network 110 in response to the selection information.

In the illustrated embodiment, each of the VMIs stored at the VMI repository 130 can be associated with particular identification information, such as user identification information or group identification information, so that one or more VMI is associated with a particular user, user group, or other group. For purposes of discussion, VMIs associated with a defined set of identification information are referred to herein as a class of VMIs. Thus, for example, the VMIs 131 and 132 can be a class of VMIs associated a particular user.

It will be appreciated that, in other embodiments, the VMI repository 130 can be distributed over multiple locations. Thus, VMIs can be stored at a user's home, work, school, and other locations associated with the user. Further, a copy of each of the VMIs 131 and 132 can be stored at each location.

In addition, each VMI in a class of VMIs can be associated with a different computing environment, intended function, or designated use. Thus, in one embodiment the VMIs 131 and 132 can be associated with a particular user, with each VMI associated with a different computing environment. For example, the VMI 131 can be associated with the user's personal or home computing environment, while the VMI 132 is associated with the user's work computing environment. Accordingly, the VMI 131 will store personal information, applications, machine configurations, and other information for the user's personal computer use, while the VMI 132 will store similar types of information for the user's work functions. In another embodiment, the VMI 131 can be associated with gaming functions while the VMI 132 is associated with multimedia processing functions. In this embodiment, the VMI 131 can store game applications, game information (e.g. saved games, character configuration information), and the like, while the VMI 132 includes multimedia processing applications (e.g. video editing applications, audio production applications), stored multimedia files, and the like.

In operation, the client device 102 executes a VMI client 117, which requests user authentication information from a user. The VMI client 117 communicates the authentication information to the VMI repository 130. Based on the received authentication information, the VMI repository 130 determines a class of VMIs associated with the user. For example, the VMI repository 130 can include a database or other data store identifying the VMIs or class of VMIs associated with the authentication information. In response to receiving the authentication information, the VMI repository 130 can search the database and determine the class of VMIs associated with the authentication information. In an embodiment, the class of VMIs is uniquely associated with the user. In another embodiment, the class of VMIs is associated with a group of users.

As referred to above, in some embodiments, the VMI repository 130 can be distributed in multiple locations, such as the user's home, work, school, and the like. The client device 102 can be configured to determine the closest location of the VMI repository 130 and communicate with the repository at that location. This can provide for faster communication between the client device 102 and the VMI repository 130.

Figure 2:
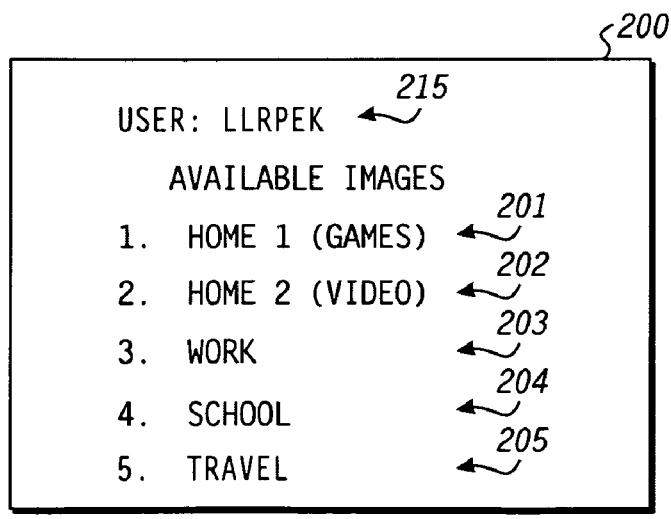
FIG. 2 illustrates a diagram of a display of virtual machine image options in accordance with one embodiment of the present disclosure.

In response to determining the class of VMIs, the VMI repository 130 communicates option information indicative of each VMI in the class to the VMI client 117, which displays a list of available VMIs based on the option information. An example display 200 is illustrated at FIG. 2. The display 200 includes user identification information 215, and options 201-205. Each of the options 201-205 is associated with a VMI available from the VMI repository 130 for the user indicated by the user identification information 215. In addition, each of the options 201-205 indicates a particular computing environment, intended use, or other characteristic of the VMI associated with the option. Thus, in the illustrated example of FIG. 2, option 201 indicates a VMI associated with the user's home (i.e. personal) computing environment and associated with games. Option 202 indicates a VMI also associated with the user's home computing environment, and associated with video applications (e.g. video presentation, video editing). Option 203 indicates a VMI associated with the user's work computer environment, while options 204 are associated with the user's school computer environment and travel environment, respectively.

Referring again to FIG. 1, the user can select one of the options presented at display 200 via manipulation of an input device, such as keyboard or computer mouse. Based on the selection, the VMI client communicates selection information to the VMI repository 130 to indicate the selected VMI. The VMI repository 130 communicates the VMI associated with the selection information to the client device 102 via the network 110. The client device 102 runs the VMI, allowing the user to interact with the virtual machine represented by the VMI.

Thus, in the illustrated embodiment, the user can access any of a number of available VMIs at a single client device. This enhances the user's flexibility and experience. For example, the client device 102 can be a portable information handling system, such as a laptop computer. As explained, the VMI client 117 provides the laptop computer to access any of the VMIs associated with the user. Accordingly, the user does not have to maintain work information, personal information, and school information at the laptop computer. Instead, the designated information can be maintained at separate VMIs associated with the user, and accessed by the user via the VMI repository 130. In addition, by maintaining different VMIs for different environments, designated uses, or other characteristics, information security can be enhanced.

In the illustrated embodiment of FIG. 1, the VMI repository provides a requested VMI to the client device 102, which locally caches the VMI. The user can interact with the locally-cached VMI at the client device 102, resulting in changes to the VMI. Accordingly, the VMI repository 130 can synchronize its stored copy of the VMI with the VMI locally cached at the client device 102, so that the VMI repository 130 maintains an up-to-date version of the VMI. In one embodiment, the VMI repository 130 can synchronize the VMI in response to expiration of a defined or programmable period of time, so that synchronization occurs periodically. In another embodiment, synchronization can occur in response to a user request or in response to a particular event, such as request to shutdown the client device 102.

Figure 3:
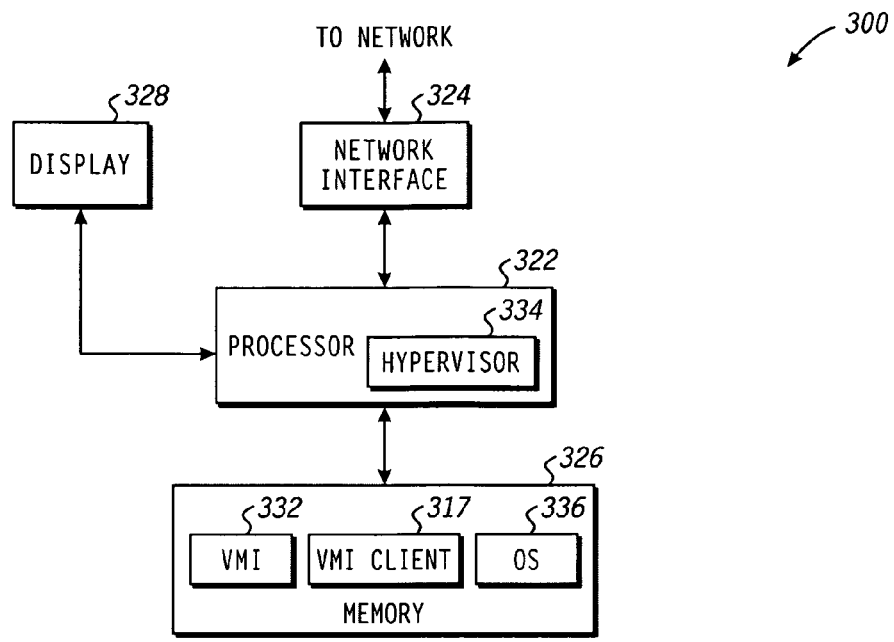
FIG. 3 illustrates a block diagram of a particular embodiment of an information handling device in accordance with one embodiment of the present disclosure.

Referring to FIG. 3, a block diagram of an information handling system 300 is illustrated. The information handling system 300 includes a processor 322, a network interface 328, a memory 326, and a display device 328. The processor 322 is connected to the network interface 324, the display 328, and the memory 326. The network interface 324 is connected to the network 110.

The network interface 324 is configured to provide a physical and logical connection layer between the information handling system 300 and the network 110. Accordingly, the network interface 324 is configured to receive information from the network 110 and manipulate that information into a designated format for processing at the information handling system 300. Further, the network interface 324 is configured to receive information from modules of the information handling system 300, such as the processor 322, and translate the information into a designated format for communication via the network 110.

The memory 326 is a computer readable medium, such as volatile memory (e.g. random access memory) or non-volatile memory (e.g. flash memory or a hard disk) configured to store computer programs including sets of instructions to manipulate the processor 322. In the illustrated embodiment, examples of computer programs stored at the memory 326 include a VMI client 317, a VMI 332, an operating system 336.

The processor 322 is a data processor configured to execute the instructions of a computer program in order to perform one or more designated tasks for the information handling system 300. In the illustrated embodiment, the processor 322 includes a hypervisor 334, which is configured to intercept communications from a virtual machine targeted to a processor and translate those communications into a specified format for manipulation by the processor 322 or other module of the information handling device 300. For example, the virtual machine can target instructions to a processor. The hypervisor 334 intercepts the instructions and translates them into a format whereby they can be executed by the processor 322. The hypervisor 334 then provides the translated instructions to the processor 322 for execution. The hypervisor 334 thereby allows the processor 322 to execute virtual machines targeted for other types of processors or information handling systems.

In operation, the processor 322 executes the VMI client 317. In one embodiment, the VMI client 317 is executed in response to a power-on reset event at the information handling system 300. In another embodiment, the processor 322 executes the operating system 336 in response to the power-on reset event, and executes the VMI client 317 in response to a user request provided via the operating system 336.

The VMI client 317 is configured to operate similarly to the VMI client 117 of FIG. 1. Accordingly, the VMI client 317 provides an interface for the user to determine a class of available VMIs at the VMI repository 130, and select one of the available VMIs to run at the information handling system 300. In the illustrated embodiment of FIG. 3, the user has selected VMI 332 via the VMI client 317. Accordingly, VMI 332 has been provided to the information handling system 300 via the network 110, and stored at the memory 326. As the VMI 332 is run, it provides instructions and other information to the hypervisor 334, which translates the instructions and other information as described above so that the processor 322 can run the virtual machine represented by the VMI 332.

As the user interacts with the virtual machine, the VMI 332 can be changed to reflect changes in information at the virtual machine. The processor 322 is configured to communicate changes in the VMI 332 to the VMI repository 130 so that the repository maintains a relatively up-to-date copy of the image.

Figure 4:
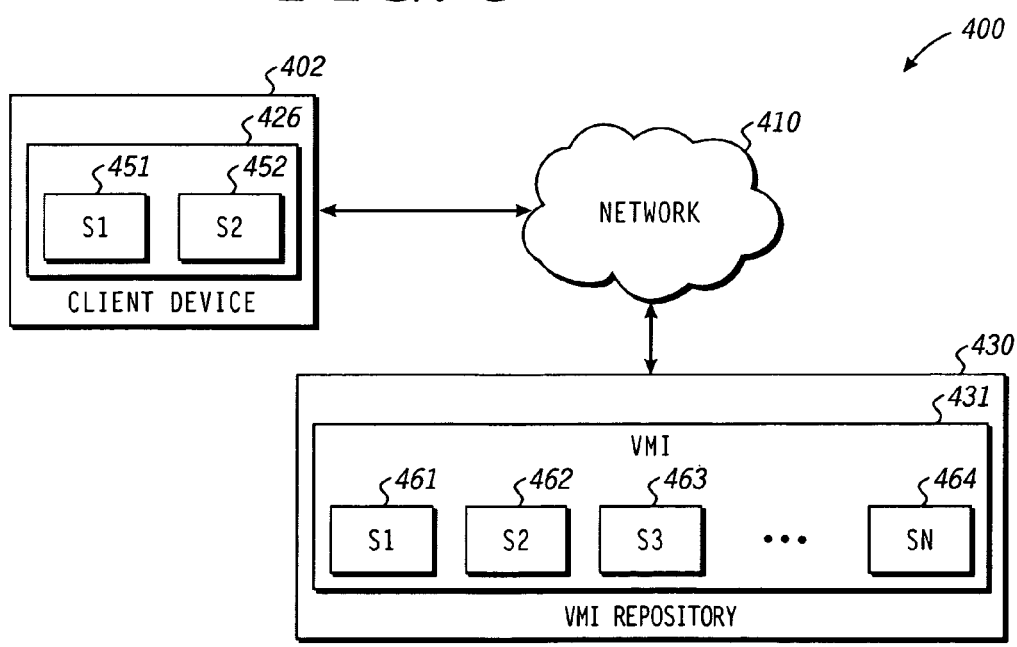
FIG. 4 illustrates a block diagram of a communication network in accordance with another embodiment of the present disclosure

Referring to FIG. 4, a block diagram of a particular embodiment of a communication network 400 is illustrated. The communication network 400 includes a network 410, a client device 402, and a VMI repository 430. The client device 402 and VMI repository 430 are each connected to the network 410. The network 410, VMI repository 430, and client device 402 are each configured similarly to the corresponding network 110, VMI repository 130, and client device 402 described with respect to FIG. 1.

In the illustrated embodiment of FIG. 4, the VMI repository stores a VMI 431, which includes a number of segments, including segments 461, 462, 463, through an Nth segment 464, labeled S1, S2, S3, through SN, respectively. As used herein, a segment of a VMI refers to a portion of a VMI that can be independently executed at an information handling system without storing all segments of the VMI. Accordingly, each segment can be associated with a software application, device driver, or other VMI portion than can be executed independently. In response to requests for the VMI 431, the VMI repository 430 is configured to provide particular ones of the segments 461-464, based on particular functions requested by a user.

To illustrate, the user at the client device can request VMI 431 via a VMI client, as described above with respect to FIG. 1. In response, the VMI repository 431 communicates one or more of the segments 461-464 to the client device 402, which stores the segments at memory 426 and executes the segments. In the illustrated embodiment, the VMI repository 431 has communicated segments S1 and S2, which are stored as segments 451 and 452, respectively. The initial set of segments communicated by the VMI repository 431 can be sufficient to provide a set of function options to the user at the client device 402. In response to user selection of one or more of the function options, the VMI repository 430 can provide additional VMI segments so that the client device can execute the selected function. For example, the initial set of segments communicated by the VMI repository 430 can be sufficient to indicate a set of available software applications for the VMI. In response to a user selection of one of the software applications, the VMI repository 430 provides additional VMI segments so that the selected software application can be executed by the virtual machine at the client device 402. Thus, in the illustrated embodiment, the VMI repository 430 provides only those VMI segments needed to perform functions requested by the user. This reduces the need to communicate an entire VMI over the network 410, improving the speed with which a user can access a desired VMI function.

Figure 5:
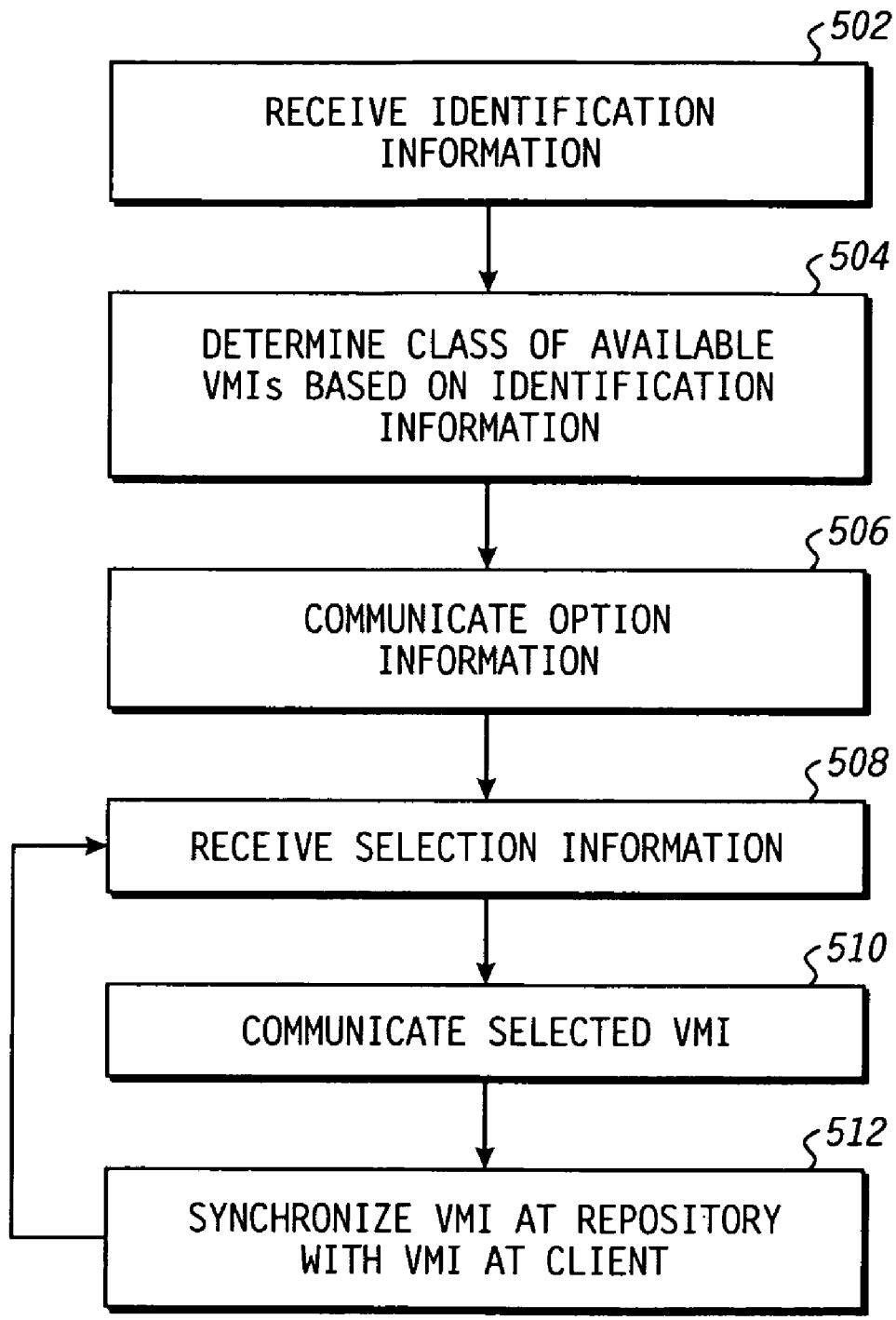
FIG. 5 illustrates a flow diagram of a method of communicating a virtual machine image in accordance with one embodiment of the present disclosure.

Referring to FIG. 5, a flow diagram of a particular embodiment of a method of communicating a VMI is illustrated. At block 502, a VMI repository receives identification information from a client device via a network. At block 504, the VMI repository determines a class of available VMIs based on the received identification information. At block 506, the VMI repository communicates option information indicating the available VMIs. At block 508, the VMI repository receives selection information indicating one of the available VMIs. At block 510, in response to receiving the selection information, the VMI repository communicates the selected VMI. At block 512, the VMI repository synchronizes the communicated VMI stored at the repository with the associated VMI stored at the client device in order to ensure the VMI at the repository is kept relatively up-to-date. The method flow returns to block 508 and selection information associated with a different VMI is received. Accordingly, the VMI repository can provide multiple VMIs to the client device in response to requests communicated via the network.

Figure 6:
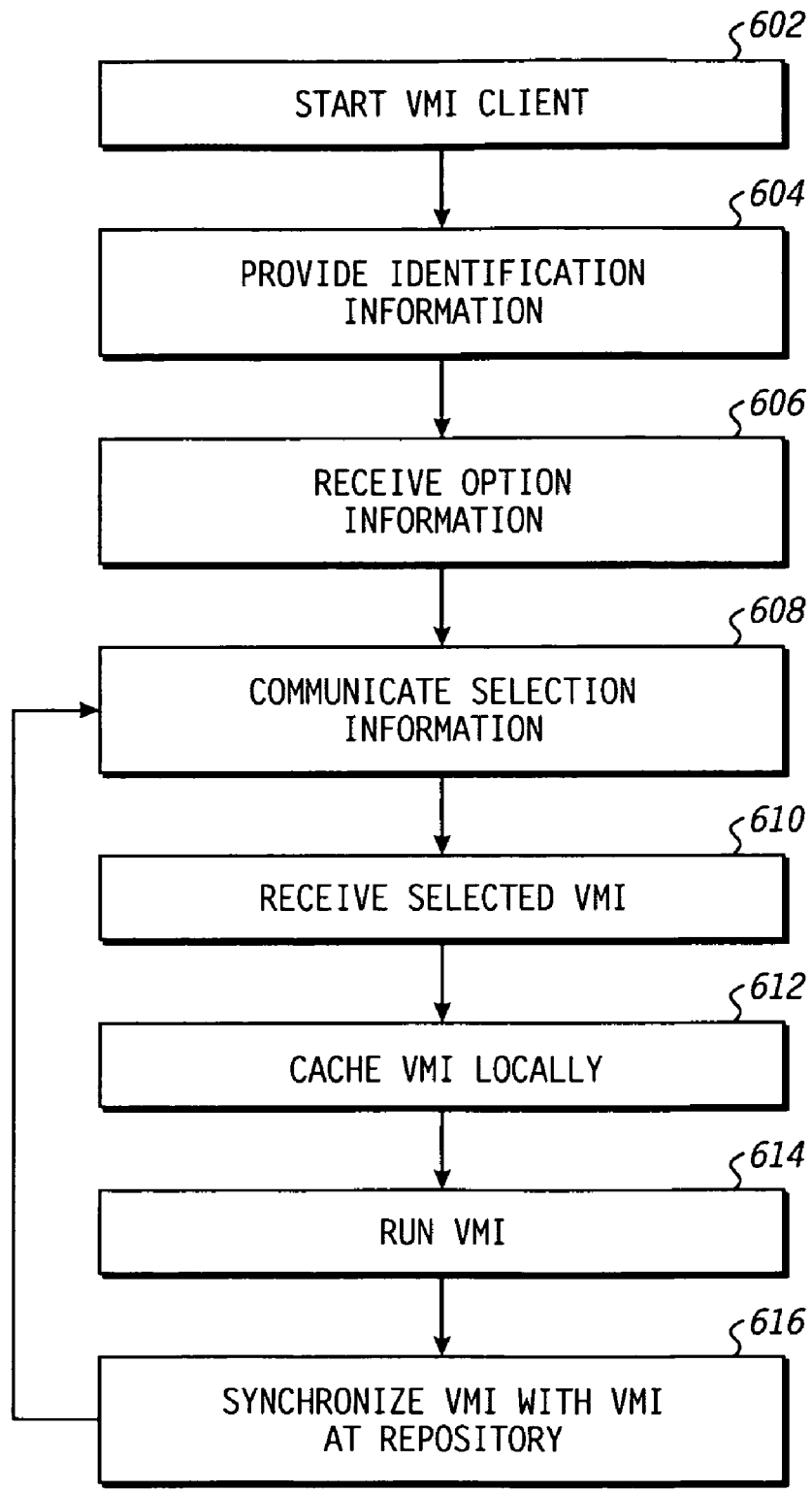
FIG. 6 illustrates a flow diagram of a method of receiving a virtual machine image in accordance with one embodiment of the present disclosure The use of the same reference symbols in different drawings indicates similar or identical items.

FIG. 6 illustrates a flow diagram of a particular embodiment of a method of receiving a VMI at an information handling system configured as a client device. At block 602, the client device starts a VMI client. At block 604, the VMI client communicates identification information to a VMI repository via a network. The identification information can identify a particular user, user group, information handling system, and the like. At block 606, in response to communicating the identification information, the client device receives option information from the VMI repository. The option information indicates a class of VMIs at the repository available for communication to the client device.

The VMI client displays a list of available VMIs based on the received option information, and allows a user to select a desired VMI. At block 608, in response to the user's selection, the VMI client communicates selection information indicative of the selected VMI. At block 610, in response to communication of the selection information, the client device receives the selected VMI via the network. At block 612, the client device caches the received VMI at a local memory and, at block 614, runs the VMI. At block 616, the client device synchronizes the locally cached VMI with the associated VMI stored at the VMI repository. In one embodiment, the client device synchronizes the VMI by providing information via the network indicating changes to the locally stored VMI resulting from the user's interactions with the VMI. The VMI repository alters the associated VMI stored at the repository based on the information.

In addition, in the illustrated embodiment of FIG. 6, the method flow returns to block 608 to allow a user to select another available VMI for communication from the VMI repository. In this embodiment, the client device can be configured to run multiple VMIs simultaneously, enhancing the flexibility of the client device.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   receiving authentication information from a client system, the authentication information indicative of a request for a first set of virtual machine images;
   determining the first set of virtual machine images associated with a user or a group of users based on the authentication information;
   communicating a list of virtual machine images to the client system via a network in response to determining the first set of virtual machine images, the list of virtual machine images indicative of each virtual machine image of the first set of virtual machine images;
   receiving selection information from the client system in response to communicating the list of virtual machine images, the selection information indicative of a first virtual machine image of the first set of virtual machine images, the first virtual machine image includes a plurality of image segments, each of the plurality of image segments can be executed independently at the client system;
   identifying a subset of the plurality of image segments; and
   communicating the subset of image segments to the client system in response to receiving the selection information.

2. The method of claim 1, further comprising:
   determining a synchronization indicator associated with the first virtual machine image;
   synchronizing the first virtual machine image between the remote device and a server device in response to determining the synchronization indicator.

3. The method of claim 2, wherein determining the synchronization indicator comprises determining a change in the first virtual machine image at the remote device.

4. The method of claim 2, wherein determining the synchronization indicator comprises determining expiration of a set period of time.

5. The method of claim 1, wherein determining the first set of virtual machine images comprises determining the first set of virtual machine images based on user identification information associated with the authentication information.

6. The method of claim 1, wherein determining the first set of virtual machine images comprises determining the first set of virtual machine images based on group identification information associated with the authentication information.

7. The method of claim 1, wherein the first set of virtual machine images includes a first image associated with a first compute environment and a second image associated with a second compute environment different from the first.

8. The method of claim 1, wherein the first compute environment is selected from the group consisting of a home environment, a work environment, a school environment, and a traveling environment.

9. A method, comprising:
   identifying a closest of a plurality of virtual machine image repository servers;
   communicating identification information to one of the virtual machine image repository servers via a network, the identification information indicative of a request for a set of virtual machine images;
   in response to communicating the identification information, receiving a list of virtual machine images from the network, the list of virtual machine images indicative of each virtual machine image associated with the identification, wherein each of virtual machine images includes a plurality of image segments, each of the plurality of image segments can be executed independently at the client system;

displaying at a local device the list of virtual machine images;

communicating selection information to the virtual machine image repository server in response to displaying the list of virtual machine images; and receiving from the virtual machine repository server a first virtual machine image of the set of virtual machine images in response to communicating the selection information.

10. The method of claim 9, wherein the first virtual machine image comprises a set of image segments, and wherein receiving the first virtual machine image comprises receiving only a subset of the set of image segments.

11. The method of claim 9, further comprising:

storing the first virtual machine image at a local cache;

updating the first virtual machine image stored at the local cache to determine a second virtual machine image, wherein the first virtual machine image is updated based on user interactions with the local device; and communicating synchronization information to the network to update a remotely stored copy of the first virtual machine image, the synchronization information based on the second virtual machine image.

12. The method of claim 11, wherein communicating synchronization information comprises communicating synchronization information in response to updating the first virtual machine image.

13. A non-transitory computer readable medium physically embodying a program of instructions to manipulate a processor, the program of instructions comprising instructions to:

identify a closest of a plurality of virtual machine image repository servers;

communicate authentication information to one of the virtual machine image repository servers via a network, the authentication information indicative of a request for a set of virtual machine images;

in response to communicating the first information, receive list of virtual machine images available from the machine image repository server, the of virtual machine images indicative of each virtual machine image associated with a user or group of users indicated by the authentication information, wherein each of virtual machine images includes a plurality of image segments, each of the plurality of image segments can be executed independently at the client system; and display at a local device the list of virtual machine images.

14. The non-transitory computer readable medium of claim 13, wherein the program of instructions further comprise instructions to:

communicate selection information in response to displaying the list of virtual machine images;

receive from the network a first virtual machine image of the set of virtual machine images in response to communicating the selection information.

15. The non-transitory computer readable medium of claim 13, wherein the first virtual machine image comprises a set of image segments, and wherein the instructions to receive the first virtual machine image comprises instructions to receive only a subset of the set of image segments.

16. The non-transitory computer readable medium of claim 13, wherein the program of instructions further comprise instructions to:

store the first virtual machine image at a local cache;

update the first virtual machine image stored at the local cache to determine a second virtual machine image, wherein the first virtual machine image is updated based on user interactions with the local device; and communicate synchronization information to the network to update a remotely stored copy of the first virtual machine image, the synchronization information based on the second virtual machine image.

17. The non-transitory computer readable medium of claim 16, wherein the instructions to communicate synchronization information comprise instructions to communicate synchronization information in response to updating the first virtual machine image.

* * * * *